US005203217A

United States Patent [19]

Buckley

[11] Patent Number: 5,203,217

[45] Date of Patent: Apr. 20, 1993

[54] PIVOTING COVER TO SEPARATE PAIR OF ROLLERS

[75] Inventor: Franklin J. Buckley, Bethel, Conn.

[73] Assignee: Pitney Bowes Inc., Stamford, Conn.

[21] Appl. No.: 883,993

[22] Filed: May 18, 1992

[51] Int. Cl.[5] ........................... F16C 1/10; B65H 7/00

[52] U.S. Cl. ..................................... 74/500.5; 74/354; 74/501.5 R; 271/160; 271/273

[58] Field of Search ............... 74/501.5 R, 500.5, 399, 74/89.2, 208, 352, 353, 354; 271/160, 256, 273, 274

[56] References Cited

U.S. PATENT DOCUMENTS

| | | | |
|---|---|---|---|
| 3,661,383 | 5/1972 | Morrison | 271/273 |
| 4,027,871 | 6/1977 | Niemeyer et al. | 271/160 X |
| 4,458,890 | 7/1984 | Kawazu | 271/160 X |
| 4,647,034 | 3/1987 | Sawa | 271/273 X |
| 4,843,903 | 7/1989 | Tanaka et al. | 74/354 |
| 5,150,630 | 9/1992 | Kida et al. | 74/354 |

FOREIGN PATENT DOCUMENTS

| | | | |
|---|---|---|---|
| 55-89140 | 7/1980 | Japan | 271/160 |

*Primary Examiner*—Rodney H. Bonck
*Assistant Examiner*—Ryan W. Massey
*Attorney, Agent, or Firm*—Charles R. Malandra, Jr.; Melvin J. Scolnick

[57] ABSTRACT

Apparatus for separating a pair of contiguous rollers from each other, the rollers being located beneath a cover. The apparatus includes: a pair of opposed, side frames; a lower roller fixedly mounted to the side frames; an upper roller adjustably mounted to the side frames; a biasing agent to bias the upper roller against the lower roller; a cover for the upper and lower roller pivotably mounted to the side frames; and a cable connected to the cover and to the upper roller. When the cover is pivoted from its closed positon to its open position, the cable is caused to move the upper roller away from the lower roller.

7 Claims, 5 Drawing Sheets

PIVOTING COVER TO SEPARATE PAIR OF ROLLERS

BACKGROUND OF THE INVENTION

The instant invention relates to apparatus for clearing a paper jam between two rollers, and more particularly to a pivoting cover for such rollers which can be used to separate the two rollers from each other and facilitate access to the area of the rollers to enable jam clearance. The invention is particularly applicable to optical machine readers used in inserter systems.

Photodetection of indicia on forms and the like is known. In such systems, a narrow beam of light is focused as a spot or slit of light on the relevant field to be scanned and is moved over the field, either by the deflection of the beam or movement of the form. Light reflected from, or transmitted through, the form is focused on a photocell or other photodetector so that indicia may be detected as variations in the photocell output. Typically, photocell outputs are small so that the photocell is connected to an amplifier and the amplified output is further processed by the system.

One application of photodetection is in the control of inserter systems, which separate and process discrete documents, assemble the documents and other materials into batches to be mailed together and insert the batches into envelopes. Inserting systems are typically controlled according to information, for example "dash codes", encoded on control documents. Dash codes consist of lines, normal to the direction of motion of the printout, which are printed on the control document, typically on the sprocket strips of the printout. The field containing the dash codes is scanned by reflected light as the control document is received by the inserter system and the presence or absence of lines of encoded information defines the operations relating to that control document.

A scanning apparatus used in conjunction with inserting machines having various document feeders is known as an "optical mark reader" or OMR. The OMR requirement for inserting machines has existed for some time and optical scanner technology has developed to satisfy this requirement. For example, in U.S. Pat. No. 4,659,939 issued to John L. Lorenzo on Apr. 21, 1987 and assigned to the assignee of the present invention, there is disclosed an optical scanning system, commonly referred to as an OMR scanner, including an amplifier which automatically adjusts the background reference level and a photodetector which detects light reflected from or transmitted through objects such as code markings on forms. It is well known to use such an OMR scanner in conjunction with document feeders in console inserter systems.

An OMR includes a pair of feed rollers to advance the of the OMR. Because of the nature of paper feeding, occasionally paper will become jammed in the OMR, and because of the lack of space in the OMR, removal of the jammed paper is difficult to effect.

The instant invention is therefore intended to facilitate clearance of paper jams in the OMR, or any other unit in which there is minimal space to clear jams or to provide additional apparatus to facilitate jam clearance.

SUMMARY OF THE INVENTION

Accordingly, the instant invention provides apparatus for separating a pair of contiguous rollers from each other, the rollers being located beneath a cover. The apparatus includes: a pair of opposed, side frames; a lower roller fixedly mounted to said side frames; an upper roller adjustably mounted to said side frames; a biasing agent to bias the upper roller against the lower roller; a cover for the upper and lower roller pivotably mounted to the side frames; and a cable connected to the cover and to the upper roller, whereby when the cover is pivoted from its closed position to its open position, the cable is caused to move the upper roller away from the lower roller.

DETAILED DESCRIPTION OF THE PREFERRED EMBODIMENT

Figure 1:
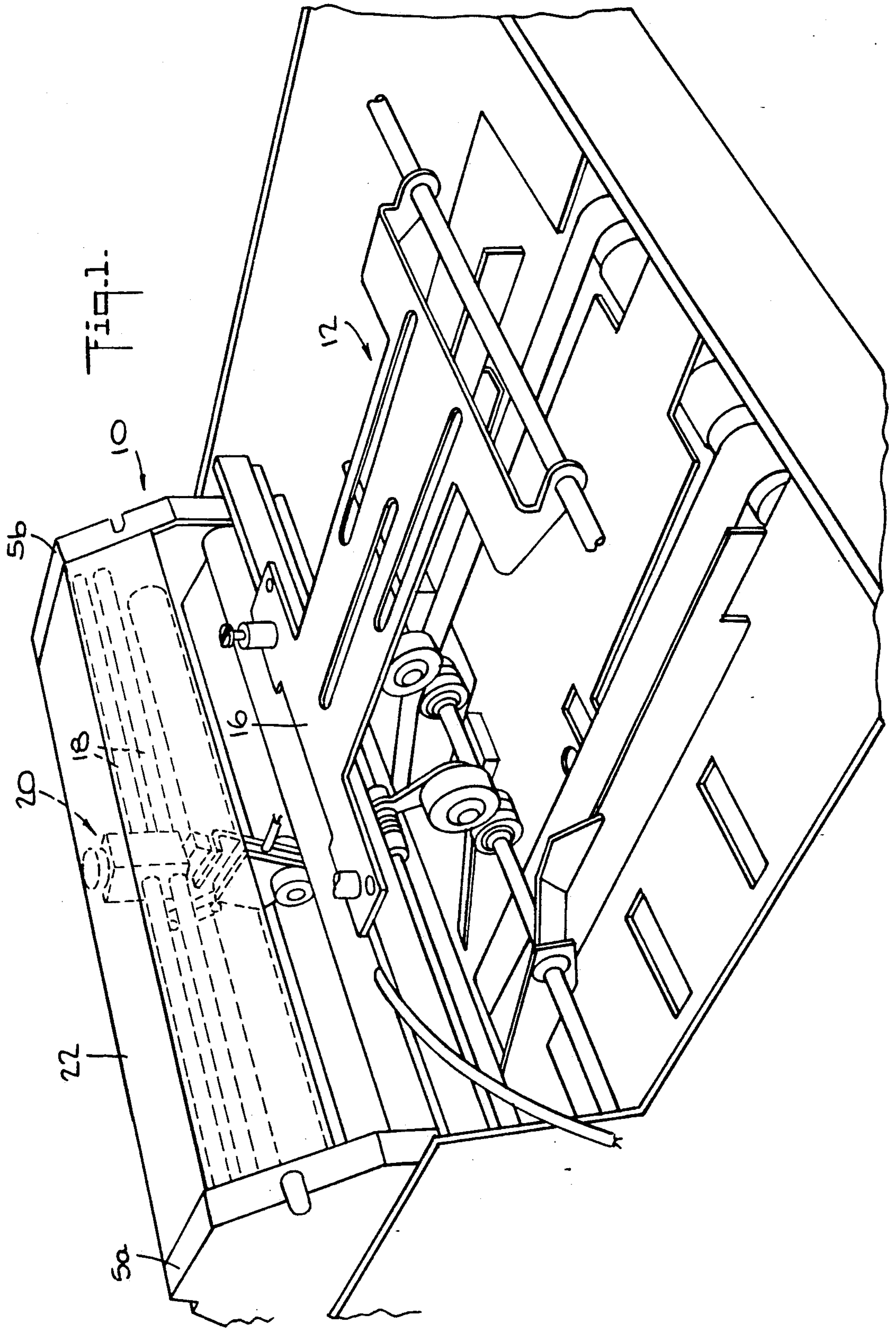
FIG. 1 is a perspective view of a portion of a document feeder having an optical mark reader module mounted thereto in accordance with the instant invention.
Figure 3:
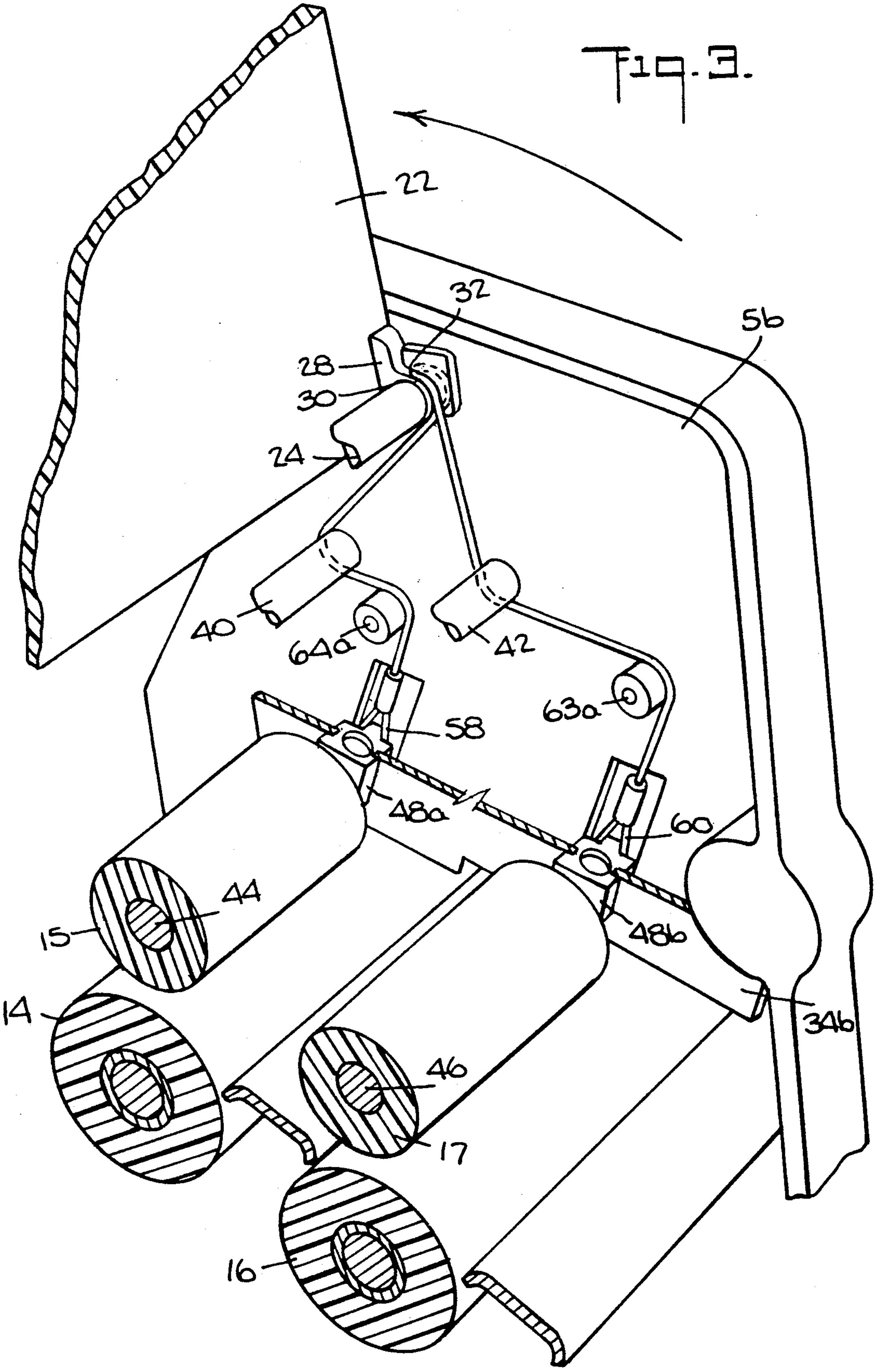
FIG. 3 is an enlarged, cut-away, perspective view of the cabling mechanism, rollers and pivoting cover used in the optical mark reader seen in FIG. 2.

In describing the preferred embodiment of the instant invention, reference is made to the drawings, wherein there is seen in FIG. 1 a downstream end of a document feeder for a tabletop inserting machine comprising an OMR scanner station 10 and a queuing station 12. The OMR scanner station 10 is located between frame members 5*a* and 5*b* and includes an OMR scanner assembly 20, a pair of rollers 14 and 15 which convey documents fed from a feeder module (not shown) and a second pair of rollers 16 and 17 (see FIG. 3) which convey the documents to the queuing station 12 where registration of the documents is achieved before the documents are transported for further processing. The OMR scanner assembly 20 is mounted to a pair of shafts 18 which are transversely mounted to the frame members 5*a* and 5*b*. An example of the feeder module is described in detail in U.S. patent application Ser. No. 617,238 filed Nov. 21, 1990 and assigned to the assignee of the present invention.

Associated with the OMR scanner assembly 20 is a cover 22 which includes a pair of integral flanges 28 at its upstream ends. Each integral flange 28 includes an aperture 30 and an L-shaped channel 32 to be discussed in detail hereinbelow. A shaft 24 extends between the frame members 5*a* and 5*b* and engages the apertures 30 of the integral flanges 28 so that the cover 22 can pivot on the shaft 24 between closed and open positions seen respectively in FIGS. 4 and 5.

Figure 2:
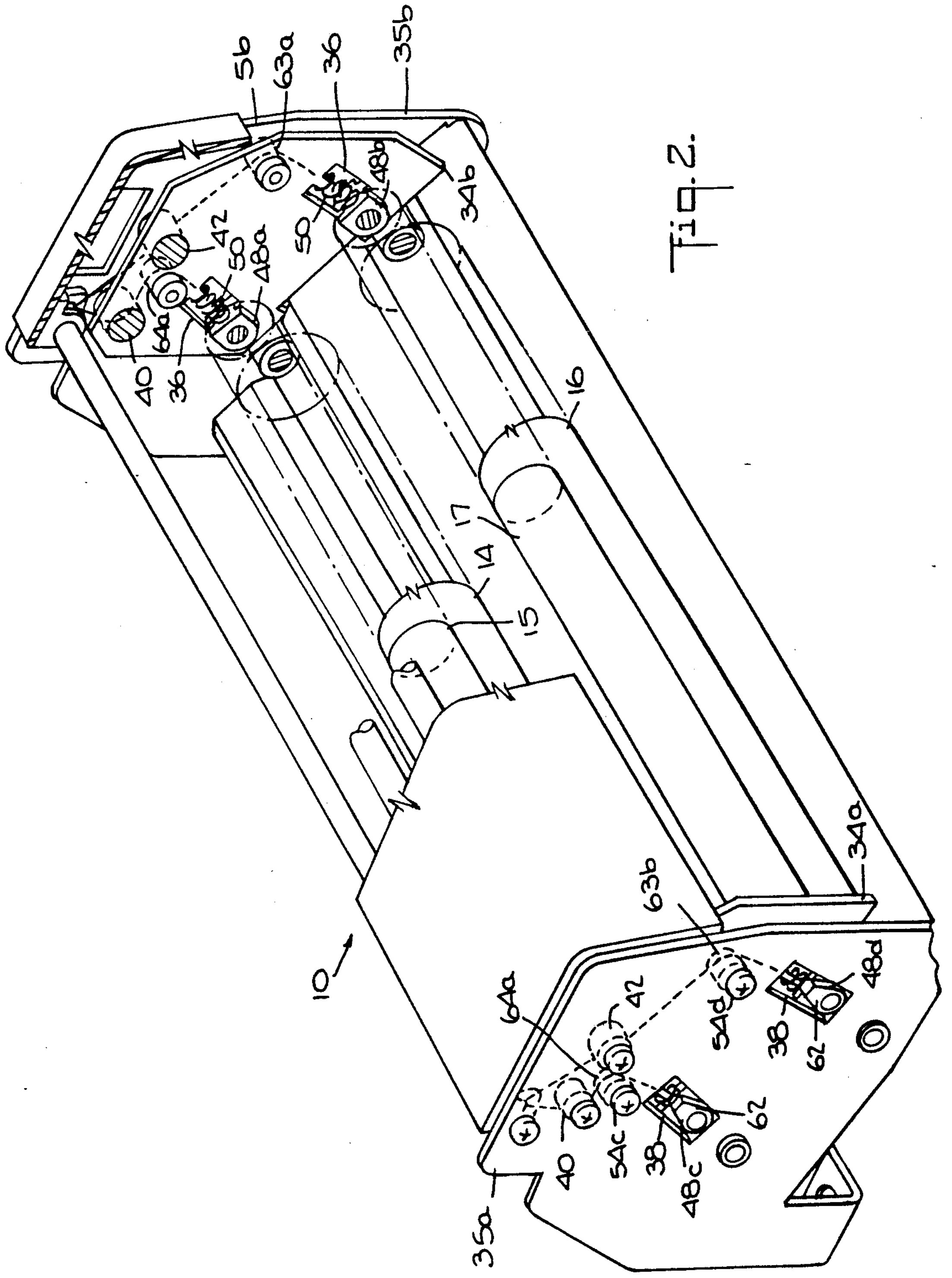
FIG. 2 is a perspective view of the optical mark reader module seen in FIG. 1.

Each of the upper rollers 15 and 17 is spring biased against its mating, lower roller 14 and 16 respectively. Located adjacent but spaced from each frame member 5*a* and 5*b*, on the interior side thereof, are a pair of supporting plates 34*a* and 34*b* (see FIG. 2). Each of the plates 34*a* and 34*b* includes a pair of stepped, rectangular channels 36. Each of the frame members 5*a* and 5*b* has a rectangular opening 38 for clearing a journal bearing 48. The plates 34*a* and 34*b*, as well as the frame members 5*a* and 5*b*, are connected and aligned with each other by means of two shafts 40 and 42 to be discussed further hereinbelow.

The upper rollers 15 and 17 are mounted on shafts 44 and 46 respectively which seat at their ends in journal bearings 48 *a–d*. Each of the journal bearings 48 *a–d* is biased downwardly toward the bottom of the stepped channels 36 by a spring 50, which is seated at one end on a projection 52 on the plate 34*a* (or 34*b*) and at the other end in an opening in the top end of the journal bearings 48. Each of the journal bearings 48 *a–d* includes a channel around its periphery which slidingly engages the lower (stepped) portion of the stepped, rectangular channels 36. Four screws 54 *a, b, c* and *d* each located above a spring 50, secure the frame member 5*a* to the plate 34*a* and the frame member 5*b* to the plate 34*b*.

Two identical lengths of cable 56 having loops 58 and 60 at their ends are situated at the ends of the rollers 15 and 17, one between the frame member 5*a* and the plate 34*a* and the other between the frame member 5*b* and the plate 34*b*. Each of the cables 56 has a loop 60 which wraps around a curved protuberance 62 (see FIG. 2) of the journal bearing 48*b* (or 48*d*). The cable 56 then extends over the cable guide 63*a* (or 63*b*) under the shaft 42, and engages the channel 32. The cable 56 then wraps around under the shaft 40 and over and around the cable guide 64*a* (or 64*b*) and culminates in the loop 58

Figure 4:
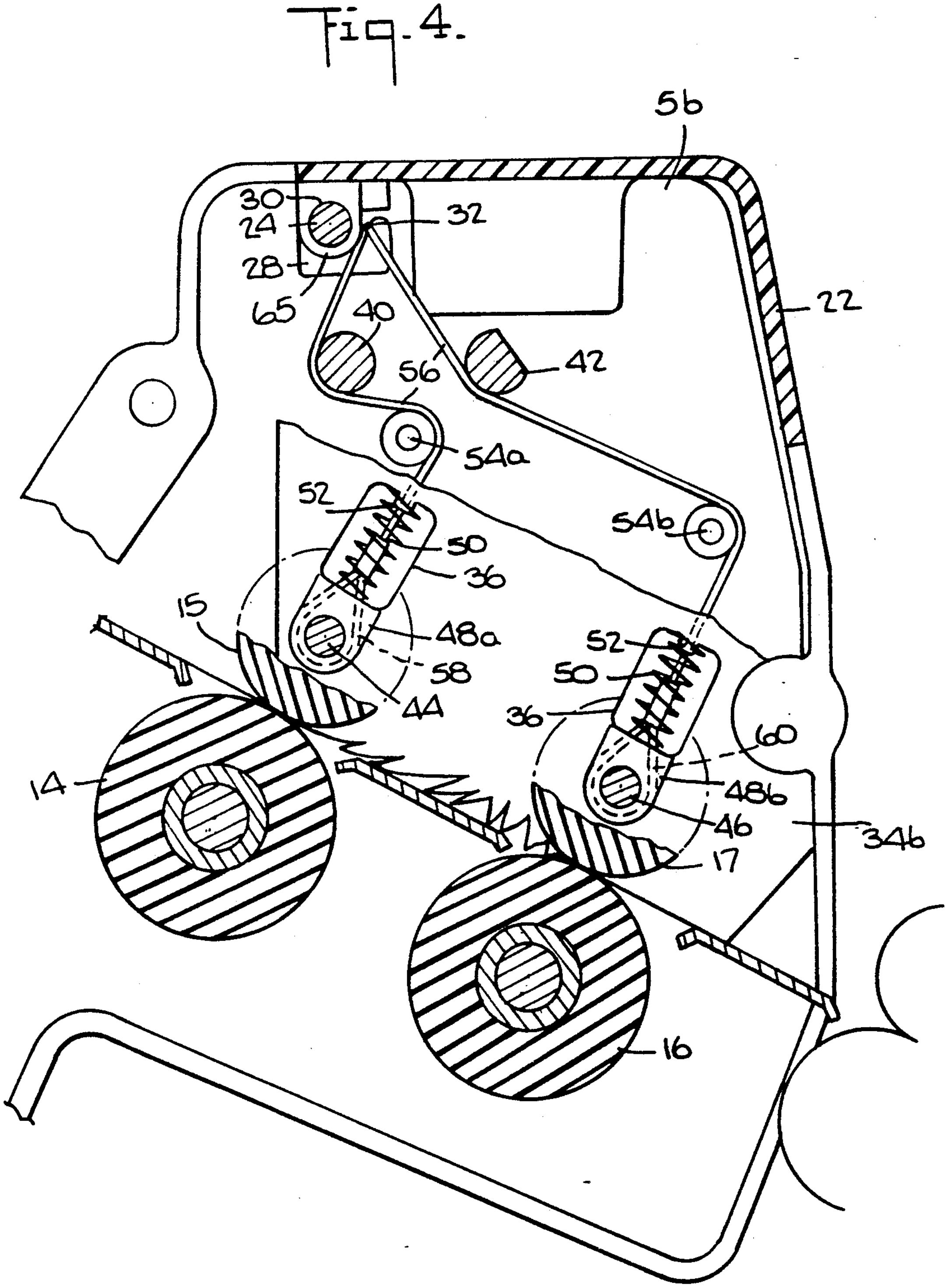
FIG. 4 is a vertical, sectional view of the apparatus seen in FIG. 2 showing the cover closed and the rollers engaged, a paper jam.
Figure 5:
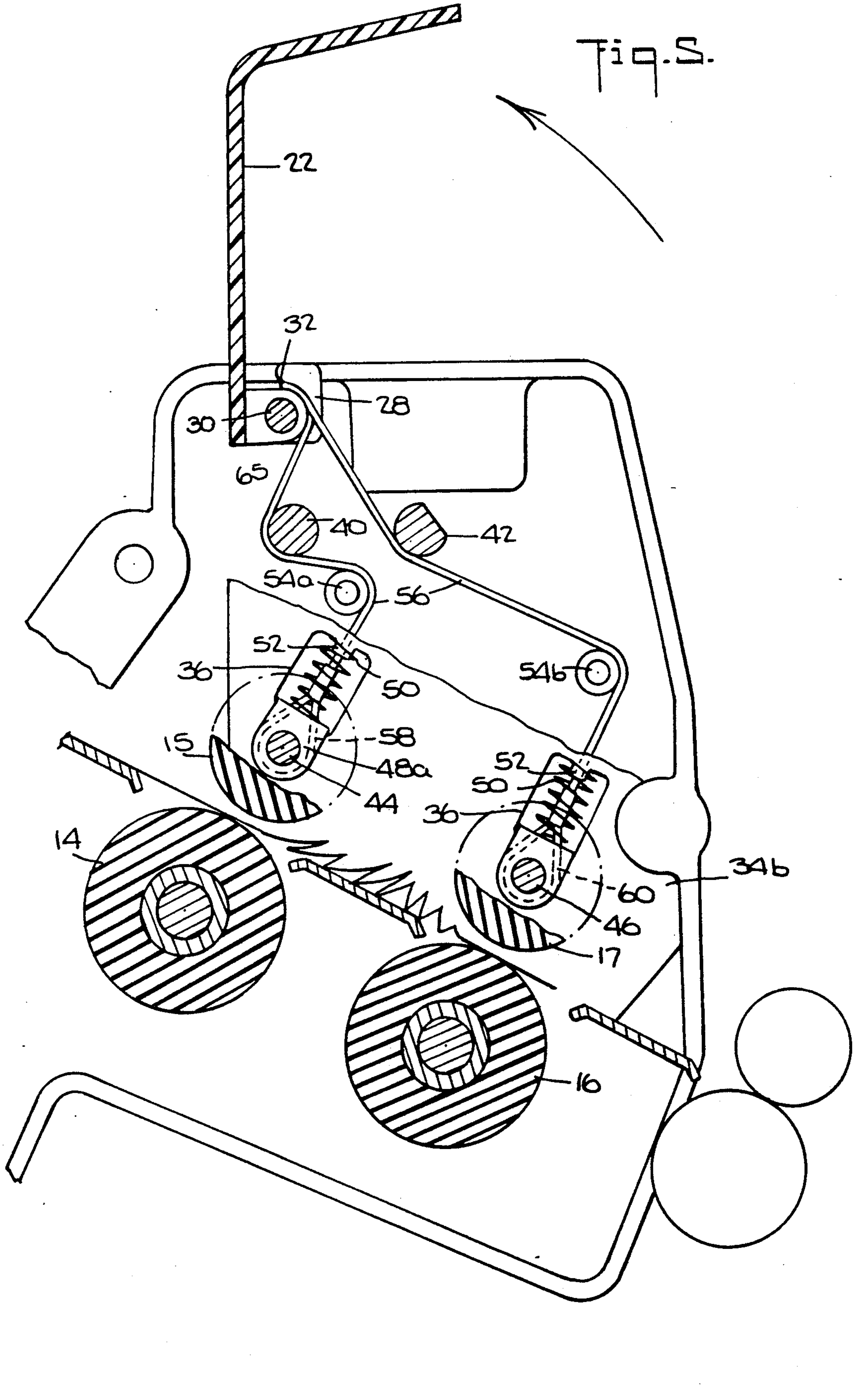
FIG. 5 is similar to FIG. 4 but shows the cover open and the rollers separated to facilitate removal of the jammed paper.

In operation, whenever a paper jam occurs in the scanner station 10, as seen in FIG. 4, it is necessary to separate the top rollers 15 and 17 from the bottom rollers 14 and 16. Removal of the paper necessitates the opening of the cover 22, which, owing to the interaction of the cables 56 and the journal bearings 48 supporting the shafts 44 and 46 which carry the rollers 15 and 17 respectively, effects a raising of the rollers 15 and 17 away from the rollers 14 and 16 respectively (see FIG. 5). This concurrent opening of the cover 22 and separation of the rollers 15 and 17 permits an operator to gain access to the jammed paper and remove the jammed paper.

The raising of the rollers 15 and 17 is effected as follows: The motion of the cover 22 being raised from the closed position seen in FIG. 4 to the open position seen in FIG. 5 causes each of the cables 56 to be raised upward over a surface 65 on the integral flange 28 on the cover 22. This in turn causes each of the loops 58 and 60 to be raised upward which causes the journal bearings 48 *a–d* to be raised upwardly against the bias of the springs 50. Since the journal bearings 48 support the rollers 15 and 17, the net result is that the rollers 15 and 17 are raised upward and separated from the rollers 14 and 16.

Although the present invention has been described with reference to an OMR unit, it is applicable to any situation where if may be desirable to separate a pair of rollers from each other, and it can be seen that the invention is applicable to a single roller, two pairs of rollers as described hereinabove, or a plurality of rollers. If three or more pairs of rollers need to be separated, additional sections of cable can be used.

While the invention has been described in conjunction with specific embodiments thereof, many alternative, modifications and variations will be apparent to those skilled in the art. It is intended to embrace all such alternatives, modifications and variations that follow within the spirit and scope of the appended claims.

What is claimed is:

1. Apparatus for separating a pair of contiguous rollers from each other located beneath a cover, comprising:

a pair of opposed, side frames;

a lower roller fixedly mounted to said side frames;

an upper roller adjustably mounted to said side frames;

means for biasing said upper roller against said lower roller;

a cover for said upper and lower roller pivotably mounted to said side frames; and a cable connected to said cover and to said upper roller, whereby when said cover is pivoted from its closed position to its open position, said cable is caused to move said upper roller away from said lower roller.

2. The apparatus of claim 1, wherein said biasing means comprises a spring.

3. The apparatus of claim 2, including a pair of lower rollers and a pair of upper rollers contiguous to said lower rollers.

4. The apparatus of claim 3, including a pair of cables, wherein the ends of each of said cables are connected to the ends of each of said upper rollers, whereby when said cover is pivoted from its closed position to its open position, said cables move said upper rollers away from said lower rollers.

5. The apparatus of claim 4, wherein said cables include loops at their ends to engage said upper rollers.

6. The apparatus of claim 5, additionally comprising means to define the path of said cables.

7. The apparatus of claim 6, wherein said path defining means comprises protuberances and shafts extending from said side frames.

* * * * *